United States Patent [19]  [11] 4,069,747
Forry et al.  [45] Jan. 24, 1978

[54] CYLINDER CONSTRUCTIONS

[75] Inventors: James Edward Forry, Monmouth; Robert Gordon Neer, Salem, both of Oreg.

[73] Assignee: Towmotor Corporation, Mentor, Ohio

[21] Appl. No.: 700,272

[22] Filed: June 28, 1976

[51] Int. Cl.² .......................... F16J 15/18; F16J 1/00
[52] U.S. Cl. ....................................... 92/166; 92/167; 92/248; 92/255
[58] Field of Search ........................ 92/167, 166, 255

[56] References Cited
U.S. PATENT DOCUMENTS

| 1,747,968 | 2/1930 | Braren | 92/167 |
| 2,983,256 | 5/1961 | Seeloff | 92/110 |
| 3,307,484 | 3/1967 | Hammelmann | 417/393 |
| 3,502,001 | 3/1970 | Moore | 91/49 |
| 3,817,155 | 6/1974 | Walter | 92/167 |

Primary Examiner—Paul E. Maslousky

Attorney, Agent, or Firm—Wegner, Stellman, McCord, Wiles & Wood

[57] ABSTRACT

An improved fluid cylinder including a housing defining a cylinder bore and having aligned piston rod openings at opposite ends thereof, which openings are nominally coaxial with the bore. A piston rod is within the bore and extends through both of the openings and a piston is located within the bore and includes a central opening receiving the rod and having a shape complementary to that of the rod while being slightly larger than the rod so that the piston may move radially on the rod. Securing elements are provided for fixing the axial position of the piston on the rod and include an annular shoulder abutted by the piston. A seal is interposed between the piston and the shoulder to preclude leakage of the working fluid therebetween. The relative radial movement of the piston on the rod compensates for lack of precise concentricity of the bore with respect to the rod receiving openings.

3 Claims, 4 Drawing Figures

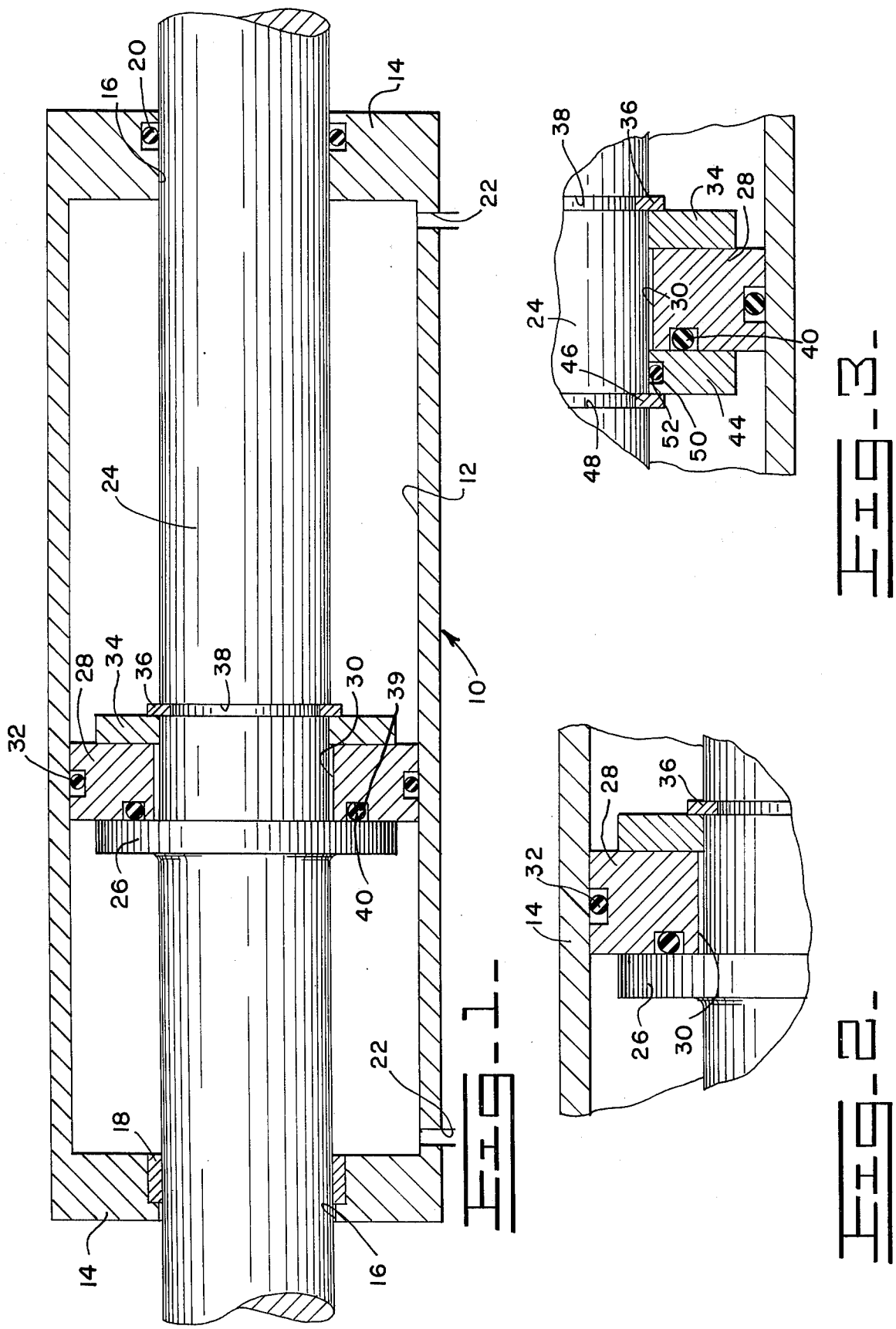

CYLINDER CONSTRUCTIONS

BACKGROUND OF THE INVENTION

This invention relates to fluid cylinders and, more specifically, to improved constructions for double rod ended fluid cylinders.

Prior art of possible relevance includes U.S. Pat. Nos. 2,983,256 issued May 9, 1961 to Seeloff; 3,307,484 issued Mar. 7, 1967 to Hammelmann; and 3,502,001 issued Mar. 24, 1970 to Moore.

The provision of an inexpensive, but reliable, double rod ended cylinder capable of employing fluid at high pressures has long been sought for a variety of uses. The principal difficulty in providing such a cylinder that is reliable and economic in construction is due to difficulty in obtaining precise concentricity of various parts. As is well known, double rod end cylinders require rod receiving openings in both ends of the cylinder housing and such openings must be aligned with each other and concentric with the cylinder bore. Slight deviations from concentricity can be accommodated through flexibility of seals employed, but when seal flexibility is relied upon, operating pressures must be similarly decreased if leakage is to be maintained at a predetermined minimum. Alternately, the stroke of the rod may be restricted to something less than the overall length of the housing so as to allow small deflections necessary to provide requisite sealing in the absence of good concentricity to occur and yet preclude binding of the rod in its housing bearings at both ends of its stroke. When this approach is employed, the resulting cylinders, of necessity, provide a considerably shorter stroke than what would be surmised from a casual inspection of the cylinder. Thus, space problems in use arise.

The last alternative is to fabricate the cylinders with exacting tolerances. Of course, this procedure is expensive and the resulting cylinders may be uneconomical for a large variety of uses.

SUMMARY OF THE INVENTION

It is the principal object of the invention to provide a new and improved double rod ended fluid cylinder. More specifically, it is an object of the invention to provide such a cylinder whereat the same may operate at high operating pressures, long strokes, and which may be fabricated economically.

An exemplary embodiment of the invention achieves the foregoing object in a fluid cylinder including a housing defining a cylinder bore and having aligned piston rod openings at both ends thereof. A piston rod extends through the bore and both of the openings and a piston is disposed within the bore. The piston is mounted on the rod against relative axial movement in such a way as to allow limited radial movement on the rod. As a consequence, the piston may move radially to automatically be self-aligning and compensate for lack of concentricity of the parts.

In a highly preferred embodiment, the piston is fixed on the rod against axial movement by an annular shoulder abutting the piston. Sealing means are interposed between the piston and the shoulder to preclude leakage of the working fluid therebetween.

In one embodiment, the annular shoulder is integrally formed by the rod, while in another embodiment, it is formed separately from the rod.

The piston may be secured against axial movement on the rod by means including a retaining ring which flanks the piston to sandwich the piston against the annular shoulder mentioned previously. Where the annular shoulder is defined by an element separate from the rod, the same is preferably provided with a radially inwardly opening groove and a seal is disposed in the groove to sealingly engage the rod.

According to the invention, the interface of the annular shoulder and the piston is provided with an axially opening annular groove which receives a sealing ring therein. In a preferred embodiment, the groove is formed in the piston.

Other objects and advantages will become apparent from the following specification taken in connection with the accompanying drawings.

DESCRIPTION OF THE DRAWINGS

FIG. 1 is a somewhat schematic, sectional view of a double rod ended cylinder embodying the invention;

FIG. 2 is an enlarged, fragmentary sectional view of the piston and rod interface;

FIG. 3 is a view similar to FIG. 2 but of a modified embodiment of the invention.

DESCRIPTION OF THE PREFERRED EMBODIMENTS

Figure 4:
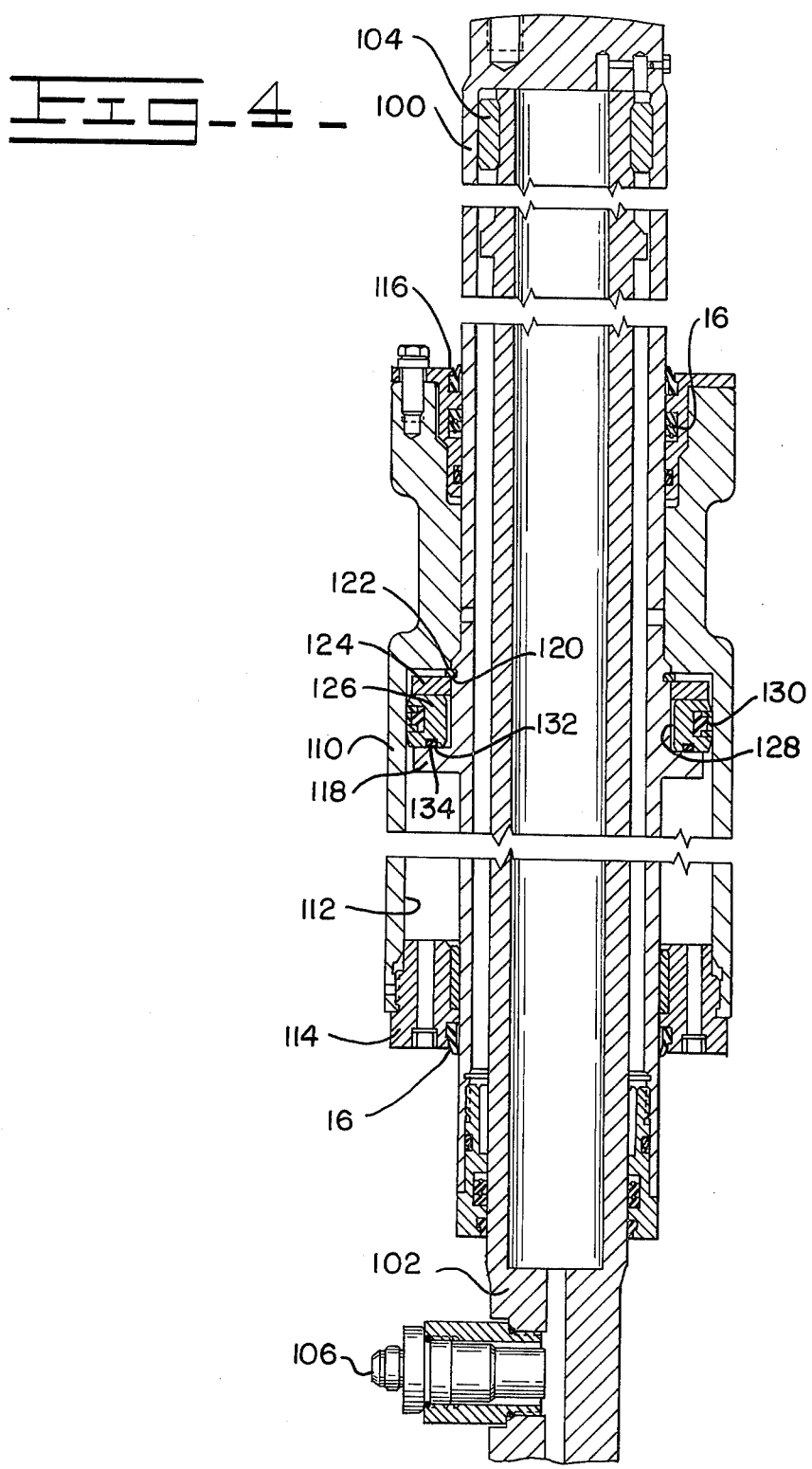
FIG. 4 is a sectional view of a cylinder embodying the invention adapted particularly for use in controlling the vertical positions of the carriage and the inner mast structure conventionally employed in lift trucks.

One embodiment of a double rod ended cylinder made according to the invention is illustrated in FIGS. 1 and 2 and is seen to include a housing, generally designated 10, defining a cylinder bore 12 and, at its ends 14, is provided with aligned, rod receiving bores or openings 16. Bearing material 18 and/or seals 20 may be provided at one or both ends 14 as illustrated. Additionally, ports 22 are employed.

A rod 24 is disposed within the bore 12 and extends through both of the openings 16, as illustrated. Typically, the rod 24 will be circular in section and, according to the embodiment of FIGS. 1 and 2, is provided with an integral, radially outwardly extending, annular shoulder 26. A piston 28 is mounted on the rod 24 in abutment with the shoulder 26. The piston 28 includes a central opening 30 of the same shape as the rod 24 and slightly larger so as to permit relative radial movement of the piston 28 on the rod 24.

At its radially outer surface, the piston 28 is provided with a seal 32 for sealingly engaging the cylinder wall 12. The piston is held in place in abutment against the shoulder 26 by an annular retaining ring 34. The retaining ring 34 is held in place by abutment with a resilient locking ring 36 removably and resiliently received in a radially outwardly opening, annular groove 38 in the rod 24.

In the usual case, the openings 16 will be nominally coaxial with the bore 12 but not actually coaxial within the desired limits. By reason of the fact the opening 30 in the piston 28 is of a size greater than the rod 24, the resulting allowable radial movement of the piston 28 between the shoulder 26 and the retaining ring 34 allows the piston 28 to automatically self-align within the bore 12 so as to be concentric with the bore 12 even though the rod 24 may not be.

To preclude leakage, the interface of the shoulder 26 and the piston 28 is provided with an axially opening groove 39. As seen in FIG. 1, the groove 39 is disposed radially outwardly of the opening 30 and separated therefrom by a land. A sealing ring 40 is disposed within the groove 39 to sealingly engage both the shoulder 26 and the piston 28. In a preferred embodiment, the groove 39 will be disposed in the piston 28.

As a consequence of the foregoing, fluid under pressure on the shoulder side of the piston 28 cannot leak to the opposite side thereof since it will encounter either the seal 32 or the seal 40. At the same time, fluid under pressure on the retaining ring side of the piston 28 will encounter one or the other of the seals before it can leak to the opposite side.

FIG. 3 illustrates a modified embodiment of the invention. Where like elements are employed, like reference numerals will be used.

The embodiment illustrated in FIG. 3 employs an annular shoulder 44 which is separate from the rod 24. The shoulder 44 is held in place by a resilient locking ring 46 received in a groove 48 in the rod 24 and cooperates with the retaining ring 34 and resilient locking ring 36 to hold the piston 28 against axial movement while allowing radial movement sufficient to cause self-alignment.

Because the annular shoulder 44 is separate from the piston rod 24, sealing means at the interface of the annular shoulder 44 and the piston rod 24 must be provided. Specifically, the resilient shoulder includes a radially inwardly opening groove 50 which receives a sealing ring 52 which sealingly engages both the annular shoulder 44 and the piston rod 24.

FIG. 4 illustrates a cylinder made according to the invention which is ideally suited for use, for example, in lift trucks. As is well known, the usual lift truck has an elevatable, inner mast structure as well as a carriage or fork and it is frequently desired in the operation of such trucks to independently move one or the other of the carriage or the inner mast structure. A cylinder housing 100 will typically be secured to the inner mast. Within the cylinder housing 100 is a rod 102 having a piston end 104 which will normally be connected to the outer mast structure. Fluid under pressure required to raise the housing 100 may be admitted to the interior of the cylinder 100 via port 106.

The outer surface of the cylinder 100 may also act as the rod of a double rod ended cylinder 110. As can be seen, the cylinder 110 includes a cylinder bore 112 which is closed at both ends by end members 114 and 116. The cylinder 100 includes an annular shoulder 118 which is radially outwardly extending within the cylinder bore 112 as well as a radially outwardly opening groove 120 for receipt of a resilient locking ring 122 for holding a retaining ring 124 against a piston 126 to sandwich the same against the annular shoulder 118.

As can be seen, the piston 126 has a central opening 128 larger than the cylinder 100 so as to allow the piston 126 to be susceptible to radial movement on the cylinder 100. Seals 130 carried by the radially outer surface of the piston 126 sealingly engage the cylinder bore 112, while a groove 132 in the side of the piston receives a sealing ring 134 for sealingly engaging the side of the annular shoulder 118.

Ports to opposite ends of the cylinder 110 are provided as illustrated, as are appropriate seals and bearings where indicated.

When employed in a lift truck, the carriage or fork will be flexibly secured to the cylinder 110. Thus, depending upon whether the upper side of the piston 126 is subjected to fluid under pressure or ported to tank return, the cylinder 110 will elevate or descend to move the carriage appropriately.

From the foregoing, it will be appreciated that a double rod ended cylinder made according to the invention does not rely upon flexibility of seals to compensate for lack of concentricity of parts and therefore is ideally suited for use at relatively high pressures which would otherwise result in excessive leakage. Similarly, full strokes of the various components are permitted, thereby eliminating space difficulties. Lastly, by reason of the self-aligning feature of the pistons, manufacturing to exceedingly close tolerances is not required, thereby providing an economical construction.

What is claimed is:
1. A fluid cylinder comprising:
    a housing defining a cylinder bore and having aligned piston rod openings at opposite ends thereof and nominally coaxial with said bore;
    a piston rod within said bore and extending through both said openings;
    a piston within said bore including a central opening receiving said rod and having a shape complementary to that of said rod and being slightly larger than said rod so that said piston may move radially on said rod;
    means fixing the axial position of said piston on said rod including at least one annular element defining a shoulder abutted by said piston and further including a retaining ring on said rod and flanking said piston to sandwich said piston against said shoulder;
    sealing means interposed between said piston and said shoulder to preclude the leakage of a working fluid therebetween; and
    an axially opening, annular groove at the interface of said piston and said annular shoulder, said groove being spaced radially outwardly of said opening and separated therefrom by a land;
    said sealing means including a sealing ring in said groove interengaging only said piston and said shoulder.
2. The fluid cylinder of claim 1 wherein said groove is formed in said piston.
3. A fluid cylinder comprising:
    a housing defining a cylinder bore and having aligned piston rod openings at opposite ends thereof and nominally coaxial with said bore;
    a piston rod within said bore and extending through both said openings and including a radially outwardly extending, annular shoulder of greater diameter than said rod and lesser diameter than said bore;
    a piston within said bore including a central opening receiving said rod and having a shape complementary to that of said rod and being slightly larger than said rod so that said piston may move radially on said rod, said piston further including opposed faces and a generally cylindrical, radially outer surface, one of said faces including an annular, axially opening groove of lesser diameter than said shoulder and facing said shoulder and of greater diameter than said central opening, said outer surface including an annular groove open radially outwardly toward said housing;
    a first sealing ring disposed in said groove in said one face and sealingly engaging said piston and said shoulder;

a second sealing ring receiving in said groove and sealingly engaging said piston and said housing;
a retaining ring disposed about said rod and engaging the other face of said piston;
a radially outwardly opening, peripheral groove in said rod spaced from said shoulder and said piston other face; and
a locking ring receiving in said groove in said rod and extending thereout of to engage said retaining ring to prevent axial movement of said piston while allowing radial movement thereof sufficient to allow self-alignment of said piston on said rod within said bore.

* * * * *